(12) United States Patent
Norton et al.

(10) Patent No.: US 8,496,201 B2
(45) Date of Patent: Jul. 30, 2013

(54) HIGH CAPACITY HEAT SINK

(75) Inventors: Daniel G. Norton, Niskayuna, NY (US); Robert J. Perry, Niskayuna, NY (US)

(73) Assignee: Lockheed Martin Corporation, Bethesda, MD (US)

(*) Notice: Subject to any disclaimer, the term of this patent is extended or adjusted under 35 U.S.C. 154(b) by 696 days.

(21) Appl. No.: 12/685,578

(22) Filed: Jan. 11, 2010

(65) Prior Publication Data
US 2011/0168348 A1    Jul. 14, 2011

(51) Int. Cl.
B64D 33/08    (2006.01)
F28C 3/04     (2006.01)

(52) U.S. Cl.
USPC .......... 244/53 R; 244/117 R; 165/41

(58) Field of Classification Search
USPC .......... 244/53 R, 117 R; 165/41; 60/668
See application file for complete search history.

(56) References Cited

U.S. PATENT DOCUMENTS

| | | | |
|---|---|---|---|
| 2,655,786 A * | 10/1953 | Carr | 60/206 |
| 2,941,372 A | 6/1960 | Taylor | |
| 3,158,197 A | 11/1964 | Blezard | |
| 3,438,602 A | 4/1969 | Noddings et al. | |
| 3,488,226 A | 1/1970 | Baker et al. | |
| 3,549,335 A | 12/1970 | Grotz, Jr. | |
| 3,739,581 A | 6/1973 | Talmor | |
| 4,273,304 A | 6/1981 | Frosch et al. | |
| 4,505,124 A | 3/1985 | Mayer | |
| 4,705,100 A | 11/1987 | Black et al. | |
| 4,776,536 A | 10/1988 | Hudson et al. | |
| 5,149,018 A | 9/1992 | Clark | |
| 5,151,171 A | 9/1992 | Spadaccini et al. | |
| 5,176,814 A | 1/1993 | Spadaccini et al. | |
| 5,207,053 A | 5/1993 | Spadaccini et al. | |
| 5,232,672 A | 8/1993 | Spadaccini et al. | |
| 5,267,608 A | 12/1993 | Coffinberry | |
| 5,313,790 A | 5/1994 | Barr | |
| 5,337,553 A | 8/1994 | Barr | |
| 5,440,172 A | 8/1995 | Sutrina | |
| 5,667,168 A | 9/1997 | Fluegel | |
| 5,678,408 A | 10/1997 | Janes | |
| 5,692,558 A | 12/1997 | Hamilton et al. | |
| 6,059,995 A * | 5/2000 | Topsoe et al. | 252/373 |
| 6,679,318 B2 | 1/2004 | Bakke | |
| 6,835,354 B2 | 12/2004 | Woods et al. | |

OTHER PUBLICATIONS

Junge, H., Bjorn, L. and Beller, M., "Novel Improved Ruthenium Catalysts for the Generation of Hydrogen from Alcohols" The Royal Society of Chemistry, (2007), 522-524.

Ando, Y., Yamashita M. and Saito, Y., "Reaction Mechanism of 2-Propanol Dehydrogenation with a Carbon-Supported Ru-Pt Composite Catalyst in the Liquid Phase" The Chemical Society of Japan, (2003), 2045-2049, 76.

(Continued)

Primary Examiner — Rob Swiatek
(74) Attorney, Agent, or Firm — Bracewell & Giuliani LLP

(57) ABSTRACT

A heat sink is used to absorb heat produced by a vehicle. The heat sink uses a steam reformer to create an endothermic reaction between two fluids. Excess heat from the vehicle's engine is used to heat the reactor to facilitate the endothermic reaction. In some embodiments, the reactant fluids are preheated by absorbing heat from various components of the vehicle. Excess heat from the various components or from the vehicle engine is used to vaporize the fluids before the fluids enter the reactor.

19 Claims, 4 Drawing Sheets

OTHER PUBLICATIONS

Mooksuwan W. and Kumar, S., "Study on 2-Propanol/Acetone/Hydrogen Chemical Heat Pump: Endothermic Dehydrogenation of 2-Propanol" International Journal of Energy Research, (2000), 1109-1122, 24.

Lee, H., Song, H.K. and Na, B-K, "Preparation of 2-Propanol Dehydrogenation Catalysts for Chemical Heat Pump System" The Chemical Society of Japan, (2000), 1015-1019, 73.

Chung, Y., Hong, S. and Song, H.K., "A Chemical Reaction Heat Pump System Adopting the Reactive Distillation Process" Korea Institute of Science and Technology, 742-747.

Ted Stern and William G. Anderson, High Temperature Lightweight Heat Pipe Panel Technology Development, Proceedings of the Space Nuclear Conference 2005, San Diego, California, Jun. 5-9, 2005, Paper 1xxx.

Kajornsak Faungnawakij, Yohei Tanaka, Naohiro Shimoda, Tetsuya Fukunaga, Shunichiro Kawashima, Fyuji Kikuchi, Koichi Eguchi, Influence of Solid-Acid Catalysts on Steam Reforming and Hydrolysis of Dimethyl Ether for Hydrogen Production, Applied Catalysis A: General 304 (2006) 40-48, www.elsevier.com/locate/apcata.

Tomonori Kawabata, Hiromichi Matsuoka, Tetsuya Shishido, Dalian Li, Yan Tian, Tsuneji Sano, Katsuomi Takehira, Steam Reforming of Dimethyl Ether Over ZSM-5 coupled with Cu/ZnO/Al2O3 Catalyst Prepared by Homogeneous Precipitation, Applied Catalysis A: General 308 (2006) 82-90, www.elsevier.com/locate/apcata.

Thomas Mathew, Yusuke Yamada, Atsushi Ueda, Hiroshi Shioyama, Tetsuhiko Kobayashi, Metal Oxide Catalysts for DME Steam Reforming: Ga2O3 and Ga2O3-Al2O3 Catalysts with and without Copper, Applied Catalysis A: General 286 (2005) 11-22, www.elseviercom/locte/apcata.

\* cited by examiner

HIGH CAPACITY HEAT SINK

BACKGROUND

1. Technical Field

This disclosure relates in general to a high capacity heat sink that is suitable for use in vehicles, particularly aircraft. This disclosure relates in particular to absorbing heat from a heat source by using the heat to facilitate an endothermic reaction in a steam reformer.

2. Description of Related Art

Vehicles may produce excess heat that must be removed from the vehicle. Jet aircraft, for example, have numerous heat sources, including the jet engine, avionics, and friction created by air passing over the exterior of the aircraft. In some circumstances, traditional heat removal techniques are not desirable. For example, radiators may be used to remove heat from an aircraft but radiators may contribute to thermal and infrared signatures, which are undesirable for tactical aircraft.

An alternative heat removal technique is to transfer excess heat into the vehicle's liquid fuel. Aircraft, for example, typically have a large amount of fuel on-board, thus making it convenient to transfer heat to the fuel before the fuel is consumed by the engine. Heating the fuel may also improve the fuel efficiency of the jet engine. However, the heat capacity of the fuel is limited. Components that come into contact with the fuel, such as seals, valves, and electronic components, may be damaged if the fuel is too hot. Furthermore, the fuel itself has a finite capacity for heat. In some circumstances, aircraft missions must end early, not because of lack of fuel, but because of lack of available heat sink capacity. Therefore, an alternative technique to remove excess heat from an aircraft, without increasing the thermal signature of the aircraft, is desirable.

SUMMARY OF THE INVENTION

A steam reformer is used as a heat sink on a vehicle such as an aircraft. The steam reformer includes a reactor that is fed by two fluids. The fluids react, possibly with the aid of a catalyst, in an endothermic reaction. The energy required for the endothermic reaction comes from excess heat produced by the vehicle. In one embodiment, dimethyl ether ("DME") and steam are used for the endothermic reaction. The DME and steam are preferably vapor when they react on the steam reformer. Each vapor, however, can pass through a cooling subsystem to absorb additional heat from various components prior to entering the steam reformer.

In an exemplary embodiment, DME flows through a low temperature system ("LTS"). The DME originates from a storage tank. A pump pressurizes the DME to cause it to flow through tubing. A controller controls the speed of the pump and thus controls the pressure and flow rate of the DME in the tubing. The controller opens, closes, or restricts flow in various metering valves to direct the DME to various components. The DME flows through heat exchangers to pick up heat, for example, from computers, communication equipment, and radar. Heat is transferred from each of these components and carried away with the DME. Temperature sensors provide temperature data to a controller so that the controller can open or close valves as needed to provide more or less cooling to each of the components to be cooled. The DME flows to a vaporizer where it absorbs heat, either from a primary heat source such as the vehicle's engine, or from other heat sources on the vehicle. The DME is vaporized in the vaporizer.

While the DME is flowing through the LTS, water is flowing through a medium temperature system ("MTS"). Water flows from a tank into tubing. Pressurized air can be used to force water out of the tank. A pump can further propel the water through the tubing. A controller adjusts the speed of the pump and opens, closes, or restricts metering valves to direct water to the various components to be cooled. The water flows through heat exchangers to cool components such as surfaces of the skin of the vehicle, avionics, or other heat sources. Temperature sensors measure the temperature of the components and provide the temperature data to a controller. The controller uses the data to adjust flow rates to provide more or less cooling to the surfaces. After absorbing heat from the heat exchangers, the water flows to a vaporizer. Heat from a primary heat source or another heat source can be used to heat the vaporizer to convert the water into steam.

The pressure of vaporized DME and water (steam) propels each of them through high pressure tubing to a DME steam reforming reactor ("DSR"). In the DSR, vaporized DME and steam react with the aid of a catalyst in an endothermic reaction. Heat from the engine is transferred by a heat pipe to the DSR. The heat is then absorbed during the endothermic reaction in the DSR. The gaseous byproducts from the reaction, such as carbon dioxide and hydrogen gas, are fed to the engine. The flammable gaseous byproducts, such as hydrogen gas, are burned in the engine and thus provide some energy toward propulsion of the vehicle.

DETAILED DESCRIPTION

Although the following detailed description contains many specific details for purposes of illustration, one of ordinary skill in the art will appreciate that many variations and alterations to the following details are within the scope and spirit of the invention. Accordingly, any exemplary embodiments of the invention described herein are set forth without any loss of generality to, and without imposing limitations thereon, the present invention.

Figure 1:
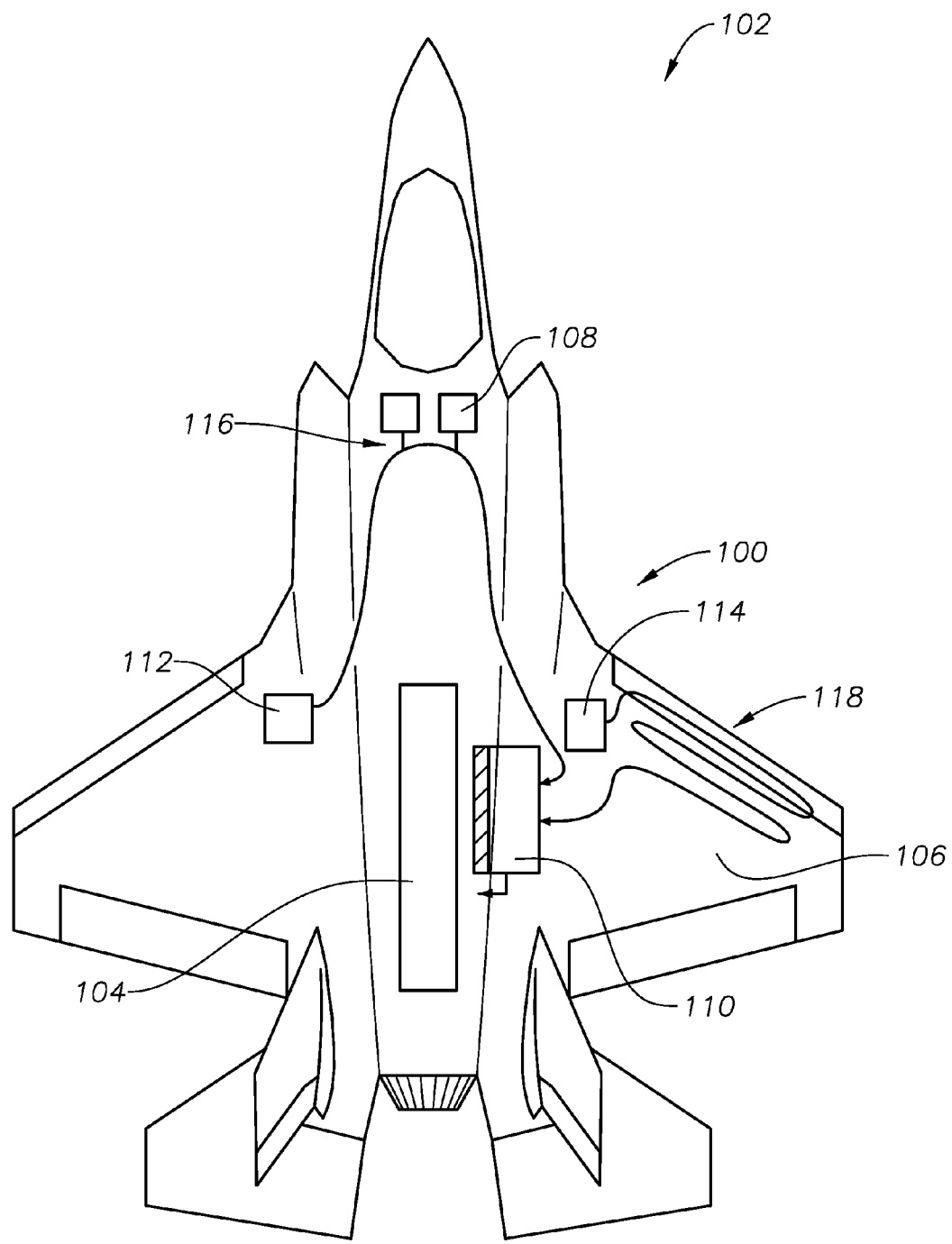
FIG. 1 is a diagrammatic view of an exemplary embodiment of a high capacity heat sink on an aircraft.

Referring to FIG. 1, high capacity heat sink ("HCHS") 100 may be used to absorb or transfer heat from various heat sources. HCHS 100 may be used, for example, to reduce heat in a vehicle such as an aircraft 102 (shown) or an automobile (not shown). Furthermore, HCHS 100 may be used in any other equipment requiring a heat sink. Sources of heat on aircraft 102 may include, for example, jet engine 104, friction resulting from skin 106 passing through air at high speed, friction-reducing plasma discharges (not shown) on skin 106, electronics 108, and the like. Electronics 108 can include avionics or any other electrical or electronic equipment located on an aircraft.

HCHS 100 may include a steam reformer, also called a DME steam reforming reactor ("DSR") 110, which performs an endothermic reaction to absorb and remove heat. Generally, two or more vapors react in the steam reformer. In one embodiment, the endothermic reaction is between materials such as dimethyl ether ("DME") 112 and water 114. DME 112 may come from a low-temperature subsystem ("LTS") 116, and water 114, preferably in the form of steam, may come from a mid-range temperature subsystem ("MTS") 118. DSR 110 and each subsystem will be described individually.

Figure 2:
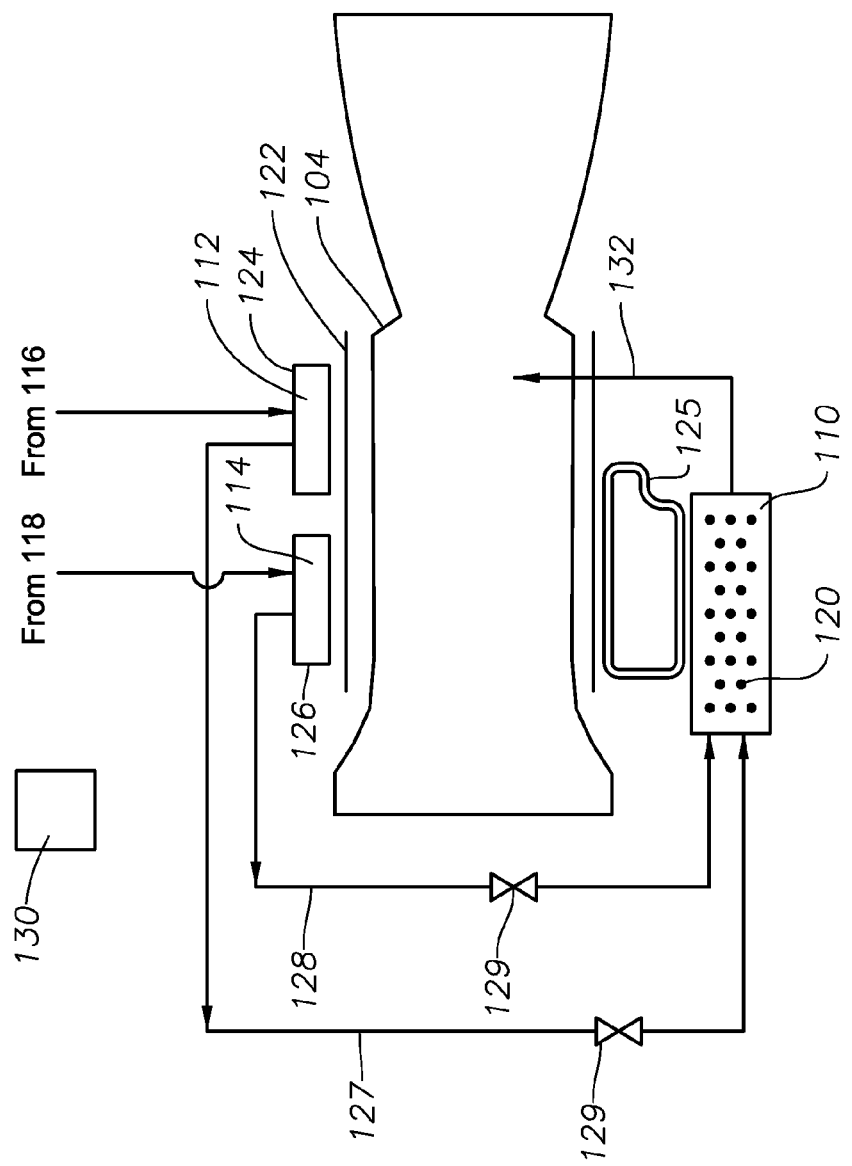
FIG. 2 is a diagrammatic view of the DME steam reforming reactor and engine of the high capacity heat sink of FIG. 1.

Referring to FIG. 2, DSR 110 is a device for performing a gas-phase reaction to convert a hydrocarbon and steam into hydrogen and carbon gases. The reaction is an endothermic reaction and thus the reaction absorbs heat from one or more heat sources. Any reactants may be used, provided that the reaction is endothermic. In a typical reaction, vaporized dimethyl ether ("DME") 112 and steam ($H_2O$) 114 are reacted in DSR 110 to produce carbon monoxide and hydrogen gas. The reaction may include a steam reforming step ("SRS") and a water gas shift step ("WGS"). The reactions may be expressed as:

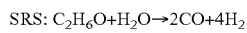

SRS: $C_2H_6O+H_2O \rightarrow 2CO+4H_2$

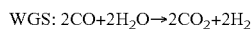

WGS: $2CO+2H_2O \rightarrow 2CO_2+2H_2$

The combined steps result in: $C_2H_6O+3H_2O \rightarrow 2CO_2+6H_2$

In one embodiment, a 1:1 molar ratio of water 114 to DME 112 (0.39 g:1 g) maximizes the amount of heat that can be sunk into the water 114 and DME 112 mixture. This optimal ratio is most likely to occur when the reaction goes to completion. Under some conditions, the reaction may not go to completion, which may cause a shift in the ratio of reactants. In some embodiments, the range could be 0.8:1 to 1.2:1 molar ratio (0.31 g:1 g to 0.47 g:1 g mass ratio).

DSR 110 may use catalyst 120 to facilitate one or more chemical reactions such as the reactions described above. The size and type of catalyst used for catalyst 120 may vary. Catalyst 120 can be a monolith or a packed-bed catalyst. A monolith catalyst may be a vessel, such as a cylinder, having a "honeycomb" support structure of rigid material supporting catalyst material. The reactants flow through the vessel and thus contact the catalyst. A packed-bed catalyst is a bed of porous catalytic material, which could be catalytic beads, supported by a porous plate. The gas or gases to be reacted may be forced up through the porous plate to pass through the porous catalytic material.

Regardless of the catalyst used, the reaction above is an endothermic reaction. The amount of energy used in the reaction may vary depending on factors such as the type and ratio of reactants, the incoming temperature of each reactant, the pressure inside DSR 110, and the presence and type of catalyst. A larger or more effective catalyst may result in a more efficient reaction and thus more heat absorption during the reaction. Similarly, a high temperature may be required to cause the reaction if no catalyst is used or a small or inefficient catalyst is used and thus more heat absorption may occur. In one exemplary embodiment having a catalyst mass of 4618 g, the reactor may require 3700-3800 J/g DME+$H_2O$ to perform the conversion. The heat input required to facilitate the reaction in this embodiment may be approximately 250 C.

The heat required to facilitate the endothermic reaction may come from excess heat generated by components of vehicle 102. The heat generating components, thus, are cooled in the process. In an embodiment wherein HCHS 100 is used as a heat sink in an aircraft, heat generating components of the aircraft my provide heat to HCHS 100. Jet engine 104, for example, may produce heat that needs to be removed from the aircraft.

Heat can be transferred from the heat generating components by any of a variety of techniques. Heat shields 122, for example, may be located along portions of the exterior of jet engine 104 and used to transfer heat to HCHS 100. DSR 110 may be placed adjacent to heat shield 122 such that heat is transferred by conduction or convection to DSR 110. Alternatively, heat may be transferred by heat pipe 125. Preferably, heat pipe 125 may be a lightweight heat pipe. As one of skill in the art will appreciate, heat pipe 125 may have a heat conductive body of for example, copper, and may be filled with a heat conductive fluid such as water. Heat from engine 104 may be transferred through the copper body to the fluid inside. Convection or a pump may cause the fluid to circulate from the heat source (engine 104) to the heat sink (DSR 110). Heat may also be transferred from engine 104 to DSR 110 by other techniques including, for example, solid heat conducting bars.

DME 112 and water are fed into DSR 110 from LTS 116 and MTS 118, respectively. DME 112 from LTS 116 may be heated in DME vaporizer 124 prior to entering DSR 110. Similarly, water from MTS 118 may be heated in water vaporizer 126 prior to entering DSR 110. DME high pressure tubing 127 may be used to transfer vaporized DME to DSR 110. Similarly, water high pressure tubing 128 may be used to transfer steam to DSR 110. In circumstances wherein DME 112 and water 114 are not vaporized in their respective vaporizers, DME 112 and water 114 may flow through tubing 127, 128 in liquid state. The vapor pressure of the vaporized DME 112 and water 114 may be all that is required to propel them through tubing 127 and 128. In one embodiment, pumps (not shown) are used to pump the DME 112 and water 114 to DSR 110.

Vaporizers 124, 126 may be any type of tube or vessel suitable for heating fluids from a liquid state to a gaseous (vapor) state. Vaporizers 124, 126 could be, for example, a length of tubing or coils of tubing near a heat source such as engine 104. Alternatively, vaporizers 124, 126 could be a cylinder or other type of vessel, preferably having a body with heat conducting members for transferring heat from a heat source to the fluid located inside the vaporizer 124, 126. Heat may be transferred to vaporizers 124, 126 by any technique, including the heat pipes and conduction techniques described above regarding transferring heat to DSR 110. Vaporizers 124, 126 can be heated by any heat source, including, for example, engine 104, skin 106, or electronics 108.

Metering valves 129 may be used to control the flow rate of DME 112 and water 114 depending on operating conditions. If, for example, engine 104 is producing little excess heat, metering valves 129 may be closed or partially closed to reduce the amount of DME 112 and water entering DSR 110. As the amount of excess heat increases, metering valves 129 may be opened further to cause more reactants to enter DSR 110 and thus provide a greater amount of heat absorption. In some embodiments, metering valves 129 are opened and closed to maintain a target heat input temperature such as, for example, 250 degrees. A. temperature controller 130 may be used to actuate metering valves 129. Various temperature sensors (not shown) on the heat source or sources, DSR 110, vaporizers 124 and 126, may provide temperature data to controller 130. As will be discussed below, DME 112 and water 114 may be heated prior to entering vaporizers 124 and 126.

The output of the reaction in DSR 110, $CO_2$ and $H_2$, flow out of DSR 110 through discharge 132. Discharge 132 may be in communication with engine 104. The output may thus flow into engine 104, where it may be combusted along with engine fuel (not shown).

Figure 3:
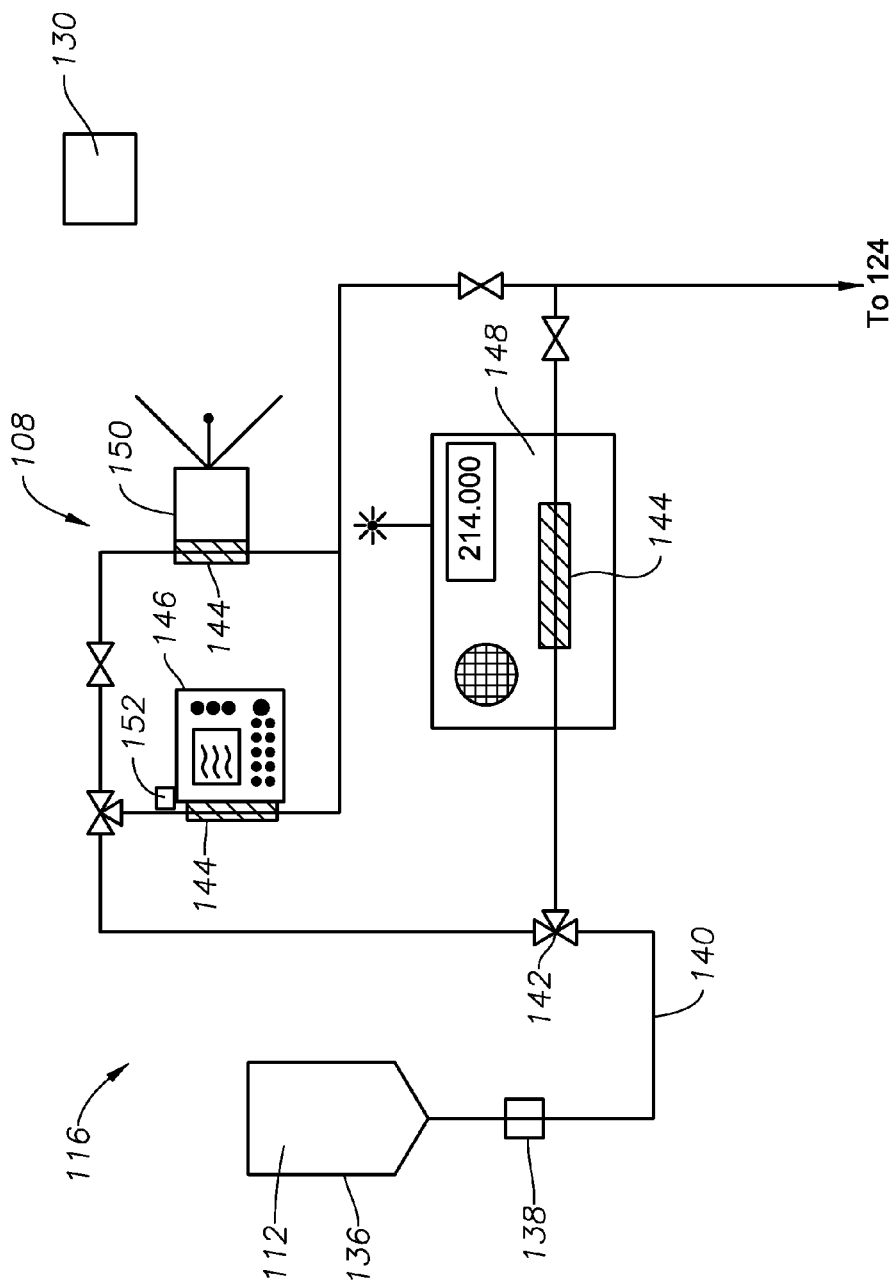
FIG. 3 is a diagrammatic view of the low temperature subsystem of the high capacity heat sink of FIG. 1.

Referring to FIG. 3, low temperature subsystem ("LTS") 116 may be used to transfer heat away from various heat producing items including, for example electronics 108. The DME 112 that is ultimately used in the endothermic gas-phase reaction thus absorbs heat in LTS 116 prior to reaching vaporizer 124. In one embodiment, DME 112 is vaporized in LTS 116 prior to reaching vaporizer 124. Vaporizer 124 may or may not be used in embodiments wherein DME 112 is vaporized in LTS 116. In other embodiments, DME 112 remains substantially in liquid form until it reaches vaporizer 124.

Tank 136 is a vessel for storing liquid DME 112. The maximum size of tank 136 is constrained by size and weight requirements of the vehicle on which it is located. Preferably, tank 136 is large enough to hold the volume of DME required to operate HCHS 100 for at least the duration of time between DME replenishments. For example, if HCHS 100 is used on aircraft 102, tank 136 preferably holds enough DME to operate HCHS 100 for at least the duration of one flight mission.

The DME 112 in tank 136 may be pressurized at any pressure. The pressure could be, for example, 200 psi. The pressure of the DME 112 may be used to propel DME 112 through tubing 140. Alternatively, pump 138 may be used to pump DME 112. Pump 138 may be located anywhere along the flowpath of DME 112, including, for example, near tank 136 (shown in FIG. 3) or nearer to vaporizer 124 (FIG. 2). Pump 138 may be any type of pump, such as a rotary (centrifugal) pump or a positive displacement pump such as a piston or screw type pump. In one embodiment, a positive displacement pump is preferred so that pump 138 can generate the pressure required to force DME 112 into vaporizer 124 when vaporizer 124 is pressurized.

One or more metering valves 142 may be used along tubing 140 for metering DME 112 into various portions of tubing 140. DME 112 may flow through tubing 140 to various heat exchangers 144. Heat exchangers 144 are heat conductive material located in contact with or close proximity to heat generating components such as, for example electronics 108 which could include, for example, computers 146, communications equipment 148, or radar 150. Heat is transferred from the heat generating components, through heat exchanger 144, to the DME 112. Tubing 140 carries the DME 112 away from the component generating heat.

The heat generated by various heat producing components may vary. Metering valves 142 may proportionally flow more or less DME 112 to each component in response to the component's temperature. Temperature sensor 152 may be located on one or more heat exchangers 144 or on any of the heat generating components to monitor the temperature. A temperature control system 130 may direct each metering valve to provide more or less DME 112 to each component in response to a signal from temperature sensor 152. Similarly, control system 130 can control pump 138. Alternatively, flow restrictors (not shown) may be used to deliver a constant flow of DME 112 to a particular component, regardless of its temperature. The volumetric flow rate may be determined based on the expected high temperature condition of the particular component and the flow restrictor may be sized accordingly. Indeed, the flow required through any segment of tubing 140 may be calculated based on the expected temperatures of the component to be cooled. Tubing 140, metering valves 142, heat exchangers 144, and the like may be sized to flow the appropriate amount of DME 112 to cool the component.

DME 112 has a boiling point of 60 C at 200 psi and may be vaporized as it absorbs heat in LTS 116. The flow rate and pressure of DME 112 in LTS 116 may be controlled to prevent DME 112 from being vaporized while it is flowing through tubing 140 and heat exchangers 144.

As discussed above, tubing 140 may lead to vaporizer 124. Referring back to FIG. 2, in some embodiments, all or some DME 112 may not be vaporized in LTS 116. Vaporizer 124 may have its own heat exchanger or heat transfer element for transferring heat to DME 112 contained therein, and thus vaporizing the DME 112 before it flows to DSR 110. Heat for vaporizer 124 may originate from any source including, for example, engine 104, electronics 108, or skin 106. Some embodiments do not use vaporizer 124.

Figure 4:
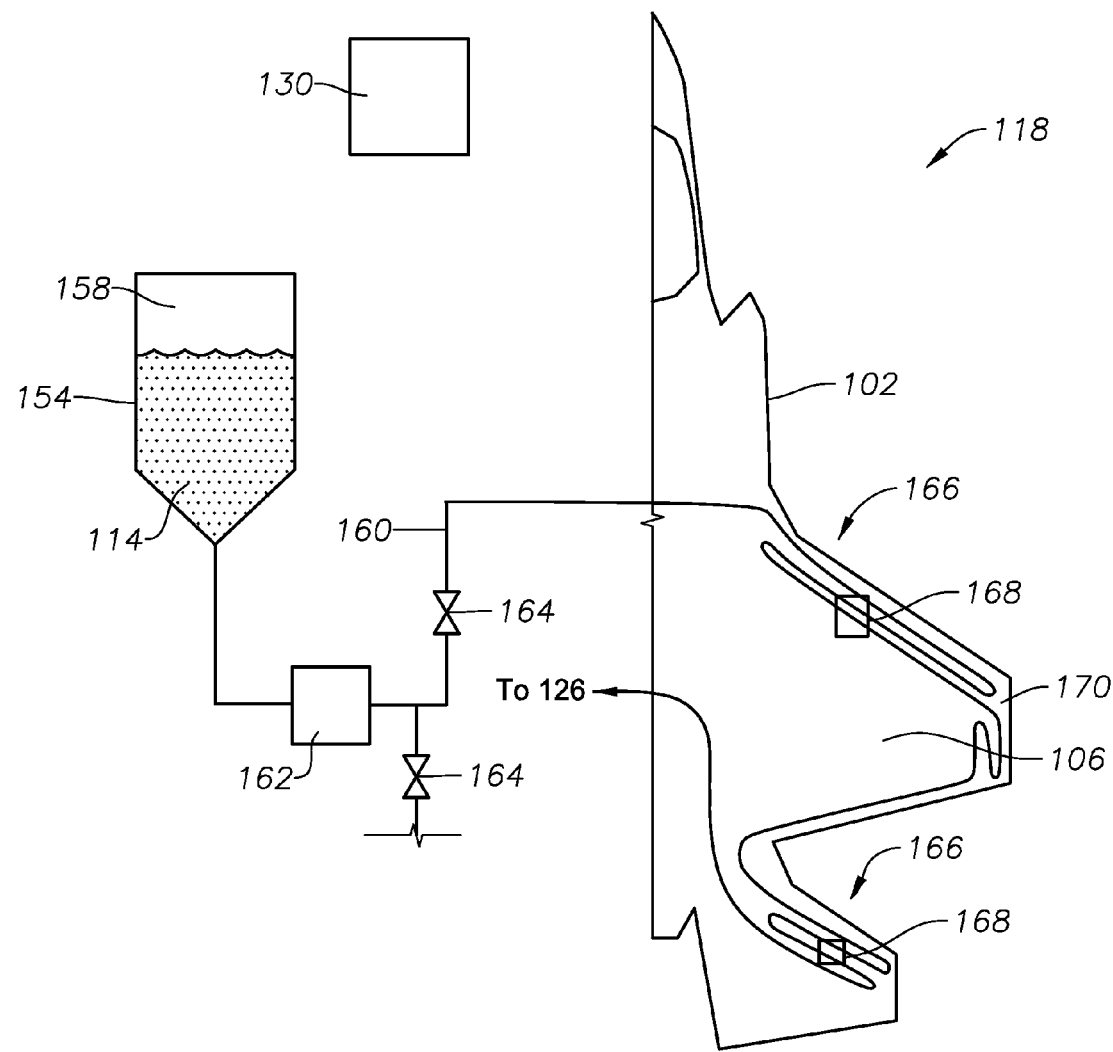
FIG. 4 is a diagrammatic view of the medium temperature subsystem of the high capacity heat sink of FIG. 1.

Referring to FIG. 4, MTS 118 may be used to transfer heat away from various heat sources. The heat sources cooled by MTS 118 may include any heat source, including, for example, skin 106 of aircraft 102. Skin 106 may be heated by friction, especially during supersonic flight, or by friction reducing plasma from a plasma generator (not shown). In some embodiments, the heat sources cooled by MTS 118, such as, for example, skin 106, may have a higher temperature than the components cooled by LTS 116. MTS 118, however, is not limited to higher temperature components and may cool any components, including the same components or same type of components as cooled by LTS 116.

Tank 154 may hold a fluid for cooling heat sources. The fluid may be water 114, or may be any other type of fluid. The volume of fluid may be any volume. As discussed previously, in an embodiment using DME 112 and water 114 as the reactants, the molar ratio of DME 112 to water 114 may be 0.8:1 to 1.2:1. Preferably, the volume of both DME 112 and water 114 is sufficient to last the duration of a flight or mission, or some other predetermined amount of time. In some embodiments, the volume of DME 112 and water 114 is approximately 3-10% of the total volume of fuel on the vehicle.

Gas 158 may be a pressurized gas in tank 154 that is used to propel water 114 out of tank 154 and through tubing 160. Pump 162 may be used to pump water 114 through tubing 160, either instead of or in addition to gas 158. Pump 162 may be located anywhere along the flowpath of water 114, including, for example, near tank 154 (as shown in FIG. 4) or nearer to vaporizer 126 (FIG. 2). Pump 162 may be any type of pump, such as a rotary (centrifugal) pump or a positive displacement pump such as a piston or screw type pump. In one embodiment, a positive displacement pump is preferred so that pump 162 can generate the pressure required to force water 114 into vaporizer 126 when vaporizer 126 is pressurized.

One or more metering valves 164 may be used to direct water 114 to various heat generating components. Tubing 160 may flow water 114 to heat exchanger 166. In the embodiment shown in FIG. 4, heat exchanger 166 is a coil of heat conductive tubing that passes back and forth along portions of an interior surface of skin 106. Skin 106 is the exterior surface of wing 170 on aircraft 102. Skin 106 may become hot as a result of friction as air passes over skin 106. Heat is transferred from skin 106 to heat exchanger 166, and ultimately to water 114 flowing within heat exchanger 166.

Temperature sensors 168 may monitor the temperature of various components that are cooled by MTS 118 and send temperature signals to temperature controller 130. Temperature controller 130 may direct metering valves 164 to flow more or less water 114 to various heat exchangers 166. Similarly, temperature controller 130 may increase or decrease the overall flow rate of water through tubing 160, either by controlling metering valves 164 or by changing the rate of pump 162.

Water 114 may be vaporized as it passes through heat exchanger 166. Controller 130 can vary the pressure and flow rate by adjusting metering valves 164 and pump 162 to prevent water 114 from being vaporized prior to reaching vaporizer 126.

The following is an operational description of one embodiment of the HCHS 100. Referring to FIG. 3, DME 112 flows through LTS 116, from tank 136. Pump 138 pressurizes DME 112 in tubing 140. Controller 130 controls the speed of pump 138 and thus controls the pressure and volume of DME 112 in tubing 140. Controller 130 opens, closes, or restricts flow in valves 142 to direct DME 112 to various components. DME 112 flows through heat exchangers 144 to pick up heat from computers 146, communication equipment 148, and radar 150. Heat is transferred from each of these components and carried away with DME 112. Temperature sensors 152 provide temperature data to controller 130 so that controller 130 can open or close valves 142 as needed to provide more or less cooling to each of the components to be cooled. DME 112 flows to vaporizer 124 (FIG. 2) where it absorbs heat from engine 104. DME 112 is vaporized in vaporizer 124.

Referring to FIG. 4, while DME 112 is flowing through LTS 116, water 114 flows through MTS 116. Water 114 flows from tank 154 into tubing 160. Pressurized air 158 forces water 114 out of tank 154. Pump 162 further propels water 114 through tubing 160. Controller 130 adjusts the speed of pump 162 and opens, closes, or restricts valves 164 to direct water 114 to various components. Water 114 flows through heat exchangers 166 to cool surfaces 106. Temperature sensor 168 measures the temperature and provides temperature data to controller 130, which controller 130 uses to adjust flow rates to provide more or less cooling to surfaces 106. After absorbing heat from heat exchangers 166, water 114 flows to vaporizer 126. Referring to FIG. 2, heat from engine 104 heats vaporizer 126 to vaporize water 114.

Still referring to FIG. 2, the pressure of vaporized DME 112 and water (steam) 114 propels each of them through high pressure tubing 127, 128, respectively, to DSR 110. In DSR 110, vaporized DME 112 and steam 114 react at catalyst 120 in an endothermic reaction. Heat from engine 104 is transferred by heat pipe 125 to DSR 110. The heat is then absorbed during the endothermic reaction in DSR 110. The gaseous byproducts, such as carbon dioxide, carbon monoxide, and hydrogen gas, are fed to engine 104. The flammable gaseous byproducts, such as hydrogen gas and carbon monoxide, are burned in the engine and thus provide some energy toward aircraft 102 propulsion.

In some circumstances, an endothermic reaction may not take place in DSR 110. For example, engine 102 may not be producing enough heat to facilitate the reaction. When this occurs, HCHS 100 may still provide cooling to aircraft 102. For example, heat sources may still provide enough heat to vaporize DME 112 or water 114, and thus the conversion will absorb heat. Furthermore, DME 112 or water 114 may still absorb heat in LTS 116 or MTS 118, respectively. Thus the enthalpy associated with heating liquid DME 112 and water 114 provides heat absorption. Indeed, in the event that there is not enough heat to vaporize DME 112 or water 114, HCHS 100 may still provide cooling as the water 114 and DME 112 are heated in their respective vaporizers. In this situation, liquid DME 112 and water 114 may flow through DSR 110 and thus to engine 104. Alternatively, a vent valve (not shown) may release liquid DME 112 and water 114 from the aircraft without passing the liquids through engine 104 or DSR 110. Thus the system can provide some cooling even if it is not operating in its most efficient manner.

We claim:

1. An apparatus for cooling a vehicle, the apparatus comprising:
   a first fluid initially located in a first vessel, the first fluid initially being a liquid and comprising dimethyl ether;
   a second fluid initially located in a second vessel, the second fluid initially being a liquid and comprising water;
   a steam reforming reactor adapted to absorb heat from a first component of the vehicle;
   wherein the first fluid and the second fluid chemically react in an endothermic reaction in the steam reforming reactor; and
   wherein the heat from the first component provides the heat necessary for the endothermic reaction.

2. The apparatus according to claim 1, wherein the first fluid and the second fluid are each transformed to a gas before entering the steam reforming reactor.

3. The apparatus according to claim 1, wherein the vehicle is an aircraft.

4. The apparatus according to claim 1, wherein the first component is an engine.

5. The apparatus according to claim 4, wherein an output from the endothermic reaction is combusted in the engine.

6. The apparatus according to claim 1, wherein the first fluid flows through a first cooling system, the first cooling system being adapted to absorb heat from a first plurality of heat producing components.

7. The apparatus according to claim 6, wherein the second fluid flows through a second cooling system, the second cooling system being adapted to absorb heat from a second plurality of heat producing components.

8. The apparatus according to claim 6, wherein the first plurality of heat producing components comprises avionics.

9. A method for removing excess heat from a vehicle, the method comprising:
   (a) placing a steam reforming thermal reactor on the vehicle;
   (b) flowing a first fluid and a second fluid into the reactor, the first fluid comprising dimethyl ether;
   (c) heating the steam reforming thermal reactor with excess heat from a first heat source of the vehicle;
   (d) causing an endothermic reaction in the reactor between the first fluid and the second fluid; and
   (e) wherein at least a portion of the heat required to sustain the endothermic reaction is provided by the first heat source.

10. The method according to claim 9, wherein each of the first fluid and the second fluid is initially in a liquid state.

11. The method according to claim 9, wherein the vehicle is an aircraft.

12. The method according to claim 9, wherein the vehicle is an aircraft, the first heat source is an engine of the aircraft, and the excess heat comprises heat from the engine.

13. The method of claim 12, wherein at least a portion of a vapor produced by the reactor flows to the engine and is combusted within the engine.

14. The method according to claim 9, wherein step (b) comprises conducting heat from a second heat source into the first fluid before the first fluid enters the reactor.

15. The method according to claim 14, wherein step (b) comprises conducting heat from a third heat source into the second fluid before the second fluid enters the reactor.

16. The method according to claim 9, wherein step (b) comprises flowing the first fluid through a first plurality of heat exchangers to absorb heat from a first plurality of heat sources within the vehicle.

17. The method according to claim 16, wherein step (b) comprises flowing the second fluid through a second plurality of heat exchangers to absorb heat from a second plurality of heat sources within the vehicle.

18. The method according to claim 16, wherein step (b) comprises flowing the first fluid through a metering valve and controlling a rate of flow of the first fluid by using a controller to adjust the valves responsive to a temperature sensor.

19. An aircraft having a system for removing heat from the aircraft, comprising:
- a first cooling subsystem, the first cooling subsystem adapted to flow a first fluid through a first plurality of heat exchangers to absorb heat from a plurality of electronic components on the aircraft;
- a second cooling subsystem, the second cooling subsystem adapted to flow a second fluid through a surface heat exchanger to absorb heat from a surface of the aircraft;
- a first vaporizer in communication with the first cooling subsystem, the first vaporizer being adapted to vaporize the first fluid by absorbing heat from an engine of the aircraft;
- a second vaporizer in communication with the second cooling subsystem, the second vaporizer being adapted to vaporize the second fluid by absorbing heat from the engine of the aircraft;
- a steam reforming reactor in fluid communication with the first vaporizer and the second vaporizer, the steam reforming reactor being adapted to facilitate an endothermic reaction between the vaporized first fluid and the vaporized second fluid, wherein the steam reforming reactor is heated by heat from the engine of the aircraft; and
- wherein an output fluid from the reaction between the first fluid and the second fluid is combusted by the aircraft engine.

* * * * *